United States Patent
Vanzieleghem et al.

(10) Patent No.: US 6,246,725 B1
(45) Date of Patent: Jun. 12, 2001

(54) MULTI-CARRIER TELECOMMUNICATION SYSTEM WITH POWER ADAPTATION MEANS

(75) Inventors: Etienne Vanzieleghem, Perwez; Frank Cyriel Michel Defoort, Kruibeke-Bazel; Peter Paul Frans Reusens, Laarne, all of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/087,708

(22) Filed: Jun. 1, 1998

Related U.S. Application Data

(60) Provisional application No. 60/052,140, filed on Jul. 10, 1997.

(30) Foreign Application Priority Data

Jun. 2, 1997 (EP) .................................................. 97401210

(51) Int. Cl.$^7$ .................................................. H04L 27/04
(52) U.S. Cl. .......................................... 375/295; 375/222
(58) Field of Search .................................... 375/222, 260, 375/295; 379/93.01; 370/431, 438, 439

(56) References Cited

U.S. PATENT DOCUMENTS

| | | | |
|---|---|---|---|
| 5,479,447 | * 12/1995 | Chow et al. | 375/260 |
| 5,610,945 | 3/1997 | Gregg et al. | 375/260 |
| 5,790,550 | * 8/1998 | Peeters | 370/480 |

FOREIGN PATENT DOCUMENTS

| | | |
|---|---|---|
| 0753947 | 1/1997 | (EP) . |
| 0753948 | 1/1997 | (EP) . |

OTHER PUBLICATIONS

"American Nat'l Std. for Telecommunications–Network and Customer Installation Interfaces– Asymmetric Digital Subscriber Line (ADSL) Metallic Interface" of the American Nat'l Stds. Inst., NY, 1995.

* cited by examiner

*Primary Examiner*—Tesfaldet Bocure
(74) *Attorney, Agent, or Firm*—Ware, Fressola, Van Der Sluys & Adolphson LLP

(57) ABSTRACT

A telecommunication transmitter (TU) for a multi-carrier transmission system of the Digital Subscriber Line [DSL] type and which includes a coding circuit (MMC) able to generate "symbols" derived from carriers (Cl–Cn) modulated by incoming data, and a line driver circuit (LDC) to amplify these symbols. When idle data are received, the power dissipated in the transmitter is reduced because the symbols are then merely derived from a few or even a single carrier (the "pilot tone") instead as from all the available carriers. The power dissipated is even more reduced because the line driver circuit is formed by a parallel connection of a high voltage but low efficiency (LL) and a lower voltage but higher performance (LH) line amplifier. The higher performance, and thus less power consuming, amplifier (LH) is used when idle data are received at the input (IN). In a variant, there is only one line amplifier of which the quiescent current is controlled as a function of the data traffic. In another variant, the number of carriers used by the coding circuit (MMC) is a function of the mean traffic of effective data received.

14 Claims, 3 Drawing Sheets

MULTI-CARRIER TELECOMMUNICATION SYSTEM WITH POWER ADAPTATION MEANS

In addition to claiming priority under 35 USC § 119(a) from EPO application 97401210.6 filed Jun. 2, 1997, this application also claims the benefit under 35 USC § 119(e) of U.S. Provisional Application No. 60/052,140, filed on Jul. 10, 1997.

TECHNICAL FIELD

The present invention relates to a telecommunication transmitter for a multi-carrier transmission system, said transmitter including coding means coupled between a transmitter input and a transmitter output and able to modulate a plurality of carriers with data received at said transmitter input and to derive therefrom symbols which are transmitted towards said transmitter output.

BACKGROUND OF THE INVENTION

A multi-carrier transmission system including such a telecommunication transmitter is already known in the art and is for instance a Digital Subscriber Line [DSL] Transceiver Unit [TU] as defined in international standards such as, for instance, the Asymmetrical Digital Subscriber Line [ADSL] standard. This standard is the "ANSI TI.413—American National Standard for Telecommunications—Network and Customer Installation Interfaces—Asymmetric Digital Subscriber Line (ADSL) Metallic Interface" of the American National Standards Institute [ANSI], New York—1995. The digital data received at the input of such a known transmitter is grouped into frames comprising a predetermined number of bits and wherefore the coding means generates corresponding symbols which are transmitted to a telecommunication line connected to the transmitter output. Since the voltage of each symbol may have different peak values, the signal voltage transmitted on the telecommunication line may vary within a relatively large range. As a consequence, the power dissipated in the telecommunication transmitter is relatively high because it has to support a large value of signal voltage to avoid, or at least minimize, occasional clipping.

SUMMARY OF THE INVENTION

An object of the present invention is to provide a telecommunication transmitter of the above known type but whereof the power dissipation is dramatically reduced.

According to the invention, this object is achieved due to the fact that said telecommunication transmitter further includes carrier selection means adapted to apply said carriers to said coding means, and data traffic detection means adapted to detect if idle data are received at said transmitter input and, if idle data are detected, to control said carrier selection means to apply a predetermined reduced set of said carriers to said coding means.

In this way, when idle data are received at the transmitter input, the symbols generated by the coding means are merely derived from a few carriers instead of from all the carriers as it is the case when effective data are applied to the transmitter input. The power on the line is thereby dramatically reduced, as well as the relatively high power dissipated in the coding means and thus in the telecommunication transmitter.

Since the symbols, which are generated when idle data are received at the transmitter input, contain only a few carriers, the power dissipated in the transmitter is reduced. In other words, if the number of carriers drops, the dissipated power is reduced accordingly.

Another characteristic feature of the present invention is that said predetermined reduced set of carriers comprises only one carrier that is applied to said coding means.

For frequency synchronization purposes, the only one remaining symbol transmitted on the line can be chosen to be derived from a so-called "pilot tone". The transmission system remains thus efficient in that it allows a fast restart owing to the fact that the synchronization on the telecommunication line is maintained, while the power dissipated is dramatically reduced with respect to that of the known system.

In a preferred embodiment, the present invention is further characterized in that said telecommunication transmitter further includes data selection means adapted to apply said data to said coding means, and in that said data traffic detection means is further adapted, if idle data are detected, to control said data selection means to discard the idle data received at said transmitter input.

As idle data may, in some circumstances, be dummy data, the latter could be used by the coding means to modulate the few or single carrier(s) from which symbols could then be derived and transmitted on the telecommunication line. However, owing to the present invention such dummy data would be discarded and the single carrier will remain un-modulated. As a result, the power dissipation is then minimal.

It should be noted that the switching between symbols derived from effective data and symbols derived from idle data, and vice-versa, can be fast whereby the power savings can be improved.

Preferably, said telecommunication transmitter operates according to a predetermined mapping and modulating protocol defined by a digital subscriber line [DSL] standard such as the Asymmetrical Digital Subscriber Line [ADSL] standard, and said symbols derived from said data are Discrete Multi-Tone [DMT] symbols.

It is obvious for a person skilled in the art that the above multi-carrier transmission technique is not limited to ADSL applications using DMT symbols, but can for instance also be used in High speed Digital Subscriber Line [HDSL] applications, in Very high speed Digital Subscriber Line [VDSL] applications, in Symmetrical Digital Subscriber Line [SDSL] applications as well as in relation with Orthogonal Frequency Division Multiplexing [OFDM] and/or Discrete Wavelet Multi Tone [DWMT] applications. The latter are also multi-carrier transmission techniques differing from ADSL in that, for instance for DWMT, the Fourier and inverse-Fourier transformers used therein are replaced by filterbanks, wavelets transformers and/or Discrete Cosine Transformers [DCT].

Also another characteristic feature of the present invention is that said coding means is adapted to count the number of symbols transmitted towards said transmitter output and to transmit at least one synchronization symbol after each group of N symbols, said synchronization symbol being derived from a frame of synchronization signals received at said data selection means, and that said N symbols and said one synchronization symbol form together a super-frame.

In case of idle data, and as already mentioned, the frequency synchronization between the transmitter and a receiver at the other end of the telecommunication line is maintained owing to the presence of the pilot tone. By sending one synchronization symbol for every N symbols, the framing synchronization is also maintained between the transmitter and the receiver.

The invention is further also characterized in that said coding means is adapted to transmit at least one line monitoring super-frame after each group of M super-frames, said line monitoring super-frame including N symbols and at least one synchronization symbol, in that said M super-frames and said line monitoring super-frame form together a hyper-frame, and in that said data traffic detection means is adapted to control said carrier selection means to apply all the carriers of said plurality to said coding means during the transmission of said line monitoring super-frame.

In the digital subscriber line transmission, the receiver measures the quality of the transmission on the line and informs the transmitter about this quality. The measurement is performed by means of the line monitor symbols transmitted in the line monitoring super-frame. If the quality of the transmission becomes to low, the receiver may request the transmitter to go back to the power-up status even if idle data are received at the transmitter input.

Still another characteristic feature of the present invention is that said data traffic detection means is adapted to control said data selection means to discard idle data received at said transmitter input after idle data has been detected for a predetermined period of time.

In a preferred application, said data received at said transmitter input are Asynchronous Transfer Mode [ATM] cells.

Also according to the present invention, the power dissipated in the telecommunication transmitter can be even more reduced owing to the characteristic feature that said telecommunication transmitter further includes line driver means coupled between said coding means and said transmitter output and adapted to amplify the symbols generated by said coding means prior to transmit them to said transmitter output, said line driver means comprising the parallel connection of a relatively low efficiency line amplifier and a relatively high efficiency line amplifier, that said amplifiers operate in a complementary way so that only one of said amplifiers is operational at a predetermined time moment, and that said data traffic detection means is further adapted to control the operation of said relatively high efficiency line amplifier if idle data are detected, and to control the operation of said relatively low efficiency line amplifier else.

When sending only the pilot tone, the line drive means do not need to comprise a class-A or class-AB amplifier that is a high voltage and high performant line amplifier. It may then advantageously be replaced by a lower voltage and thus also less power consuming line amplifier, i.e. an amplifier with a smaller idle power dissipation or a smaller supply voltage.

It is to be noted that this last characteristic feature of the present invention is preferably, but not necessary, combined with the features mentioned above. It is thus for instance possible to have a telecommunication transmitter with line driver means comprising the parallel connection of a low efficiency line amplifier and a high efficiency line amplifier operating in a complementary way, but without carrier selection means and possibly data selection means as mentioned above.

In a preferred embodiment, if idle data are detected, said one carrier applied to said relatively high efficiency line amplifier is a sinusoidal wave.

In a variant embodiment, said data traffic detection means is further adapted, if idle data are detected, to control the quiescent current of said line driver means in order to reduce the power consumption thereof.

Thereby, instead of changing from line amplifier as above, the power consumption may also be reduced by making the amplifier less linear but more efficient only for a few number of carriers.

It is to be noted that, in the two lost cases, the quality of the symbols derived, e.g., from the pilot tone and transmitted on the telecommunication line by the high efficiency line drive means remains sufficient to maintain the frequency synchronization between the transmitter and the receiver.

The present invention is also characterized in that said data traffic detection means is further adapted to compute the mean traffic of effective data received at said transmitter input over a predetermined period of time, and, accordingly, to control said carrier selection means to apply a predetermined reduced set of said carriers to said coding means in function of the computed mean traffic.

The amount of carriers used by the coding means and their power is then a function of the data traffic. By using only the number of carriers that are necessary to transmit the effective data, and each with less power, i.e. modulated with less bits of the data, instead of always using all the carriers when the actual data are reduced, the power consumption of the transmitter is reduced in function of the data traffic. This switching between high and low capacity could be done in a similar fashion as switching between high capacity and idle.

BRIEF DESCRIPTION OF THE DRAWING

The above and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
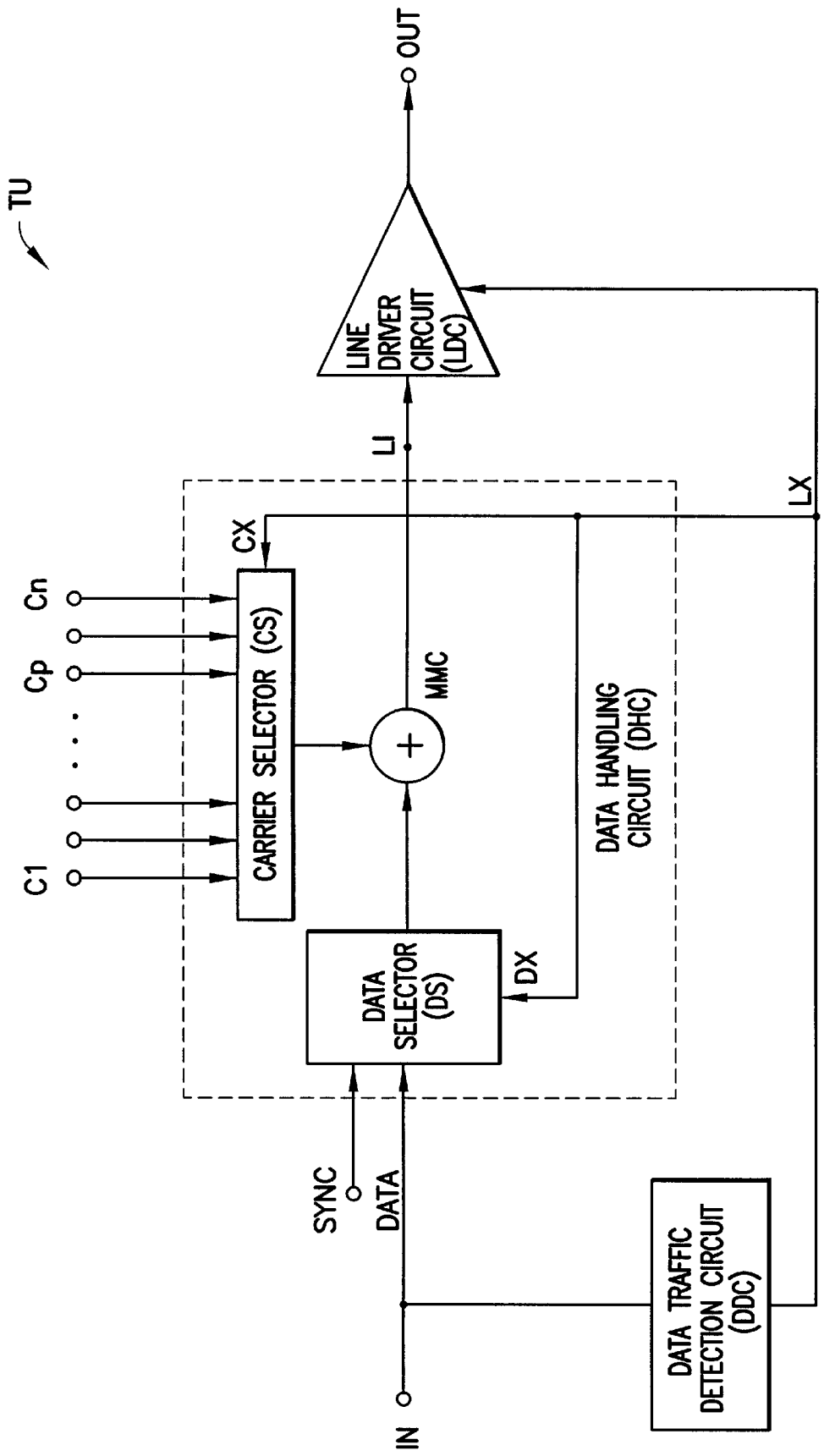
FIG. 1 represents a telecommunication transmitter TU according to the invention.

The telecommunication transmitter TU shown in FIG. 1 is of the type "ADSL Transceiver Unit—Central office side" [ATU-C] used in multi-carrier transmission system as for instance defined in the above mentioned Asymmetrical Digital Subscriber Line [ADSL] standard. Several of such transmitters are mounted in a rack which is subjected to maximum power dissipation requirements. The transmitter TU has an input IN whereat digital data, e.g. Asynchronous Transfer Mode [ATM] cells, are applied, and an output OUT where so-called "symbols" are provided. These symbols are the result of, amongst other, mapping and modulating operations performed by a data handling circuit, generally referred to as DHC, on the data received at the input IN. The transmitter TU further also includes a line driver circuit LDC coupling the data handling circuit DHC to the output OUT via a terminal LI and amplifying the symbols prior to transmit them on a telecommunication line connected to the output OUT. The telecommunication line is a copper twisted pair of wires whereof the other end is connected to a remote ADSL transceiver (not shown).

It is to be noted that in FIG. 1, the schematic representation of the ADSL transmitter TU has been largely simplified in order to show only the elements which are essential to understand the scope of the invention.

The data received at the input IN is applied to an input DATA of a data selector DS forming part of the data handling circuit DHC. The data selector DS has a second input SYNC at which synchronization signals are supplied, as will be explained later. An output of DS is connected to an input of a mapping and modulating circuit, hereafter merely called coding circuit MMC, of which another input is connected to an output of a carrier selector CS. An output of the coding circuit MMC is connected to a terminal Li further connected to an input of the line driver circuit LDC whereof an output is connected to the transmitter output OUT.

Both MMC and CS form part of the data handling circuit DHC. Several carriers C1, . . . , Cp, . . . , Cn, of which the frequencies are spread over the frequency spectrum of the Digital Subscriber Line [DSL] system and that may be pre-selected amongst a full set of carriers for their good transmission qualities for the particular line connected to the transmitter TU, are applied to like-named input terminals of the carrier selector CS. These carriers are sinusoidal waves and one of them, referred to as Cp, is the so-called "pilot tone" that insures the frequency synchronization between the present transmitter and a receiver included in the ADSL transceiver at the other end of the telecommunication line.

The data selector DS and the carrier selector CS are controlled by a data traffic detection circuit DDC via a terminal LX connected to control terminals DX and CX of DS and CS respectively. The incoming data of the transmitter TU is received in DDC via an input thereof that is connected to the transmitter input IN. The data traffic detection circuit DDC is adapted to detect the type of digital data: idle or effective, as well as the mean traffic of this data, received at the input IN. According to the result of this detection, DDC controls the selectors DS and CS as will be explained below.

If effective data are received at the transmitter input IN, and thus also at the data input DATA of the data selector DS, the latter circuit groups the bits of the data into "frames". These frames are then transferred to the coding circuit MMC that maps them to the carriers C1–Cn received via the carrier selector CS. MMC further modulates these carriers C1–Cn in function of the results of the mapping thereby generating Discrete Multi-Tone [DMT] symbols that are transferred to the line driver circuit LDC. It is to be noted that the pilot tone Cp is preferably not modulated to ensure the above mentioned frequency synchronization. The purpose of the line driver circuit LDC is to amplify the symbols prior to transmit them on the telecommunication line, its operation will be described in more detail later.

Figure 2:
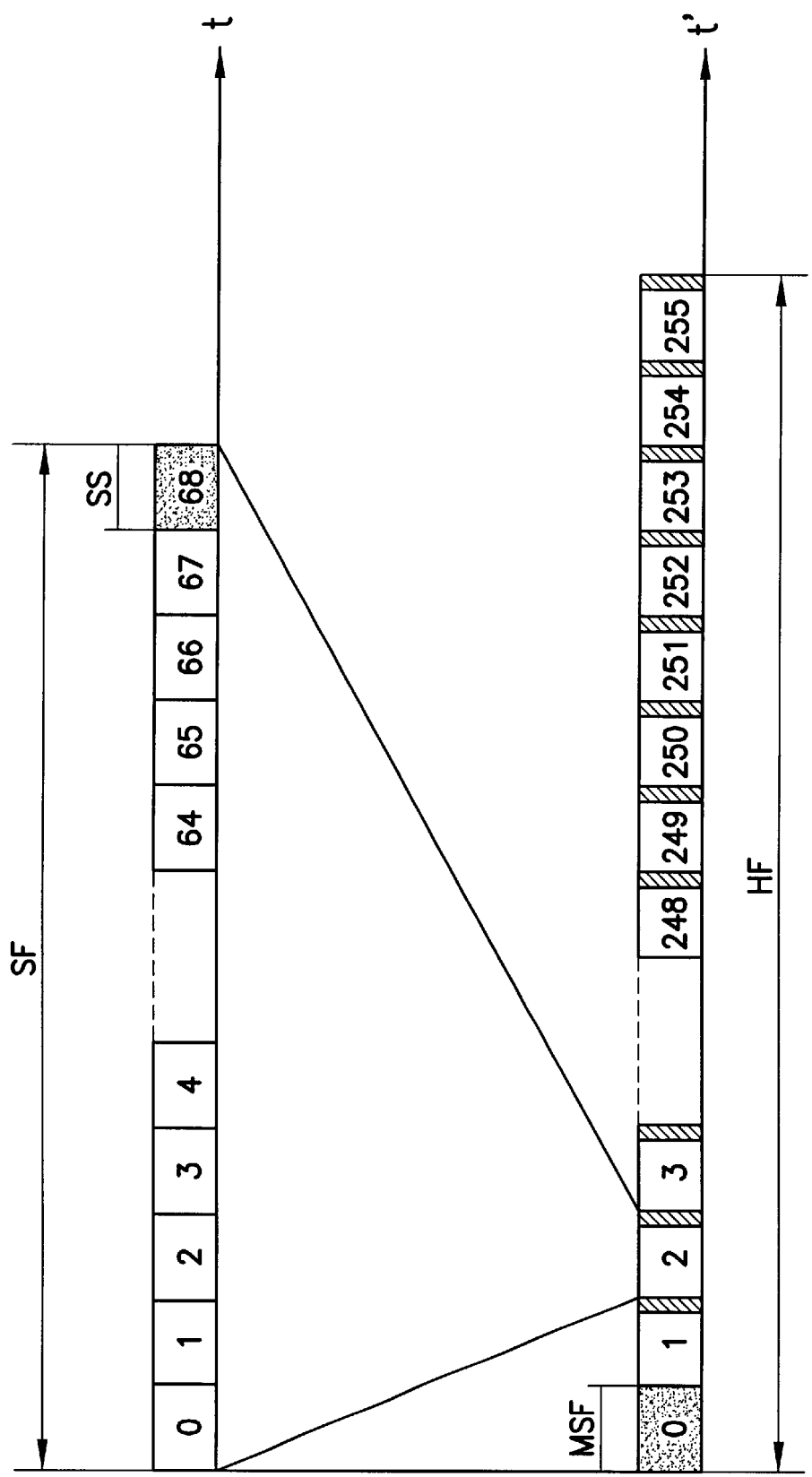
FIG. 2 shows, at different time scales, a super-frame SF and a hyper-frame HF of signals used in the transmitter of the FIG. 1.

For every N=68 DMT symbols transmitted on the line, at least one synchronization symbol is sent. To this end, at the occurrence of the $69^{th}$ symbol, the data selector DS selects its second input SYNC to get the synchronization signals instead of the data from its first input DATA. As for the data, the synchronization signals are also grouped into frames by the data selector DS. The synchronization symbol derived from such a frame is used for performing framing synchronization between the transmitter TU and the receiver at the other end of the line. A set of N=68 DMT symbols (numbered from 0 to 67) and one synchronization symbol SS (numbered 68) form together a so-called "super-frame" SF as shown in FIG. 2.

Furthermore, after having generated M, e.g. M=256, of the above super-frames, the coding circuit MMC generates at least one so-called "line-monitoring super-frame" MSF. This special super-frame MSF contains line monitoring information used by the receiver to measure the quality of the transmission on the line. A set of M super-frames and one or more line monitoring super-frame(s) MSF form together a so-called "hyper-frame". An example of such a hyper frame HF with M=256 super-frames SF (numbered from 0 to 255) and one line monitoring super-frame MSF (numbered 0) is shown in FIG. 2 at a time period t' that is larger than the time period t showing the super-frame SF in the some figure. A line monitoring super-frame MSF includes N=68 line monitoring symbols and the synchronization symbol SS. Each line monitoring symbol being generated by applying all the carriers C1 to Cn to the coding circuit MMC.

The operation of the data handling circuit DHC and more particularly that of the coding circuit MMC will not be described in more detail here since all the details of the functioning of these circuits may be found in the above mentioned Asymmetrical Digital Subscriber Line [ADSL] standard.

The power dissipated in the transmitter TU if effective data are transmitted is of about 3 Watt for 100 milliWatt effectively transmitted on the telecommunication line. This low efficiency is due to several ADSL requirements such as the signal quality requirement. Hereafter will be explained how this power dissipation will be reduced in function of the traffic on the line.

If idle data are received at the transmitter input IN, it is detected by the data traffic detection circuit DDC which then controls, via the terminal CX, the carrier selector CS to allow only a few of the carriers C1–Cn to be transferred to the coding circuit MMC. By generating symbols that are derived from a reduced number of carriers, the power dissipated in the transmitter TU is dramatically reduced. If the set of selected carriers is reduced to one, the pilot tone Cp is preferably chosen, with respect to the other carriers C1–Cn, as the single remaining carrier because it allows to maintain the frequency synchronization between the transmitter and the receiver.

In some cases, such as for instance for the transmission of ATM cells, the idle data are in fact dummy data that could be grouped in frames by the data selector DS and then be transferred to the coding circuit MMC. To avoid the generation of symbols derived from such dummy data, the data traffic detection circuit DDC also controls, via the terminal DX, the data selector DS to discard any idle data received at the input DATA. As a result, no data are then applied to the coding circuit MMC.

In other words, if idle data are received in the transmitter TU and detected by the data traffic detection circuit DDC, the latter controls the carrier selector CS and the data selector DS in such a way that the coding circuit MMC generates for instance un-modulated symbols, generally called "pilot symbols", instead of the above discrete multi-tone DMT symbols. The frequency synchronization is ensured by the choice of the pilot tone Cp forming always part of the selected carriers, whilst the frame synchronization is ensured by the synchronization symbols SS that are generated as usual, i.e. as with effective data. The line monitoring super-frame MSF is composed of idle or effective symbols but in any case with all the carriers C1 to Cn selected and applied to the coding circuit MMC.

Another parameter that influences the power dissipation is the so-called "crest factor". The crest factor is the ratio of the peak voltage over the Root Mean Square [RMS] voltage on the telecommunication line and is thus a function of the voltage of the symbol transmitted on the line. The crest factor of the line signal in a multi-carrier transmission system is rather unfavorable. In practice, the power dissipated in the transmitter is much higher than the power actually transmitted on the line. It is known that the lowest crest factor is obtained by a sinusoidal wave wherefore it is then equal to the root of 2. Since all the carriers, including the pilot tone, are pure sinusoidal waves, the pilot symbols generated if idle data are detected have the lowest crest factor and the power dissipated is then minimal.

The power dissipated in the transmitter TU when only pilot symbols are transmitted reduces from the above 3 Watt to about 1 Watt.

In a preferred embodiment, the transmitter TU informs the receiver that pilot symbols will be sent in order to avoid unnecessary decoding operations at the receiver side. On the other hand, in order to avoid excessive swaps between the transmission of DMT symbols and pilot symbols, i.e. swaps between a power-up and a power-down status respectively, the data traffic detection circuit DDC measures the time during which idle data are received at the transmitter input IN. DDC then controls the carrier selector CS and the data selector DS of the data selection handling DHC so that pilot symbols are only generated after a predetermined time of idle data being received. In a variant of this implementation, the data traffic detection circuit DDC may count a predetermined number of frames of idle data received. The behavior of DDC is then the same as when it measures time.

Figure 3:
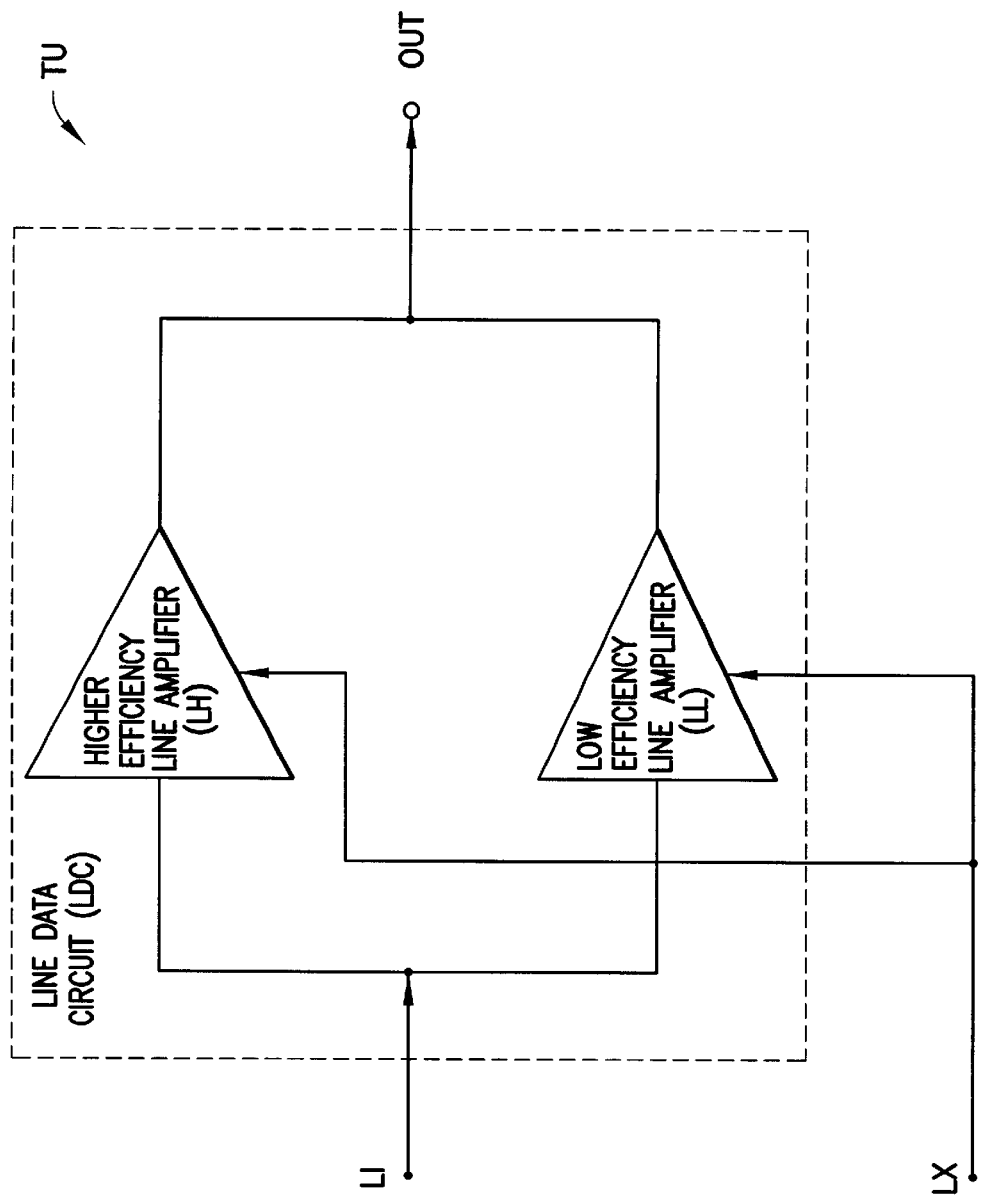
FIG. 3 represents a possible implementation of the line driver circuit LDC included in the telecommunication transmitter TU of FIG. 1.

As already mentioned, the data handling circuit DHC has an output terminal LI coupled to a line driver circuit LDC that is itself connected to the transmitter output OUT. LDC amplifies the symbols generated by DHC prior to transmit them on the telecommunication line. To this end, the line driver circuit LDC generally includes a high voltage line amplifier that is generally a class-AB or a class-A amplifier. A drawback of this amplifier is that it has a low efficiency and consumes a lot of power. However, in case of transmission of idle data, i.e. of pilot symbols, such a high voltage amplifier is not necessary. The low efficiency line amplifier may then advantageously be replaced by a lower voltage, higher performant and thereby less power consuming line amplifier. Such an implementation is shown in FIG. 3, where a low efficiency line amplifier LL is coupled in parallel with a higher efficiency line amplifier LH between the terminals LI and OUT. The operation of the line driver circuit LDC is such that only one of the amplifiers LL or LH operates at a predetermined time moment. They are therefore controlled by the data traffic detection circuit DDC via its output terminal LX. In more detail, if effective data are transmitted, DDC controls the low performant but high voltage line amplifier LL to operate, while it prevents the symbols to be transmitted through the amplifier LH. On the contrary, if idle data, i.e. pilot symbols, are transmitted, DDC prevents the amplifier LL to operate, while it controls the higher performant and lower voltage line amplifier LH to operate.

In a variant (not shown) of this embodiment, the line driver circuit LDC only comprises one, low efficiency, line amplifier and, if idle data are transmitted, the data traffic detection circuit DDC controls the quiescent current [Iq] thereof. Although the line amplifier is thereby made less linear, its power consumption is dramatically reduced and becomes thus more efficient when only a few number of carriers are uses In the two last cases, a gain of about 1 Watt may be obtained on the power consumption. However, the quality of the signals transmitted on the telecommunication line via the high efficiency line amplifier has to remain sufficient to maintain the synchronization between the transmitter and the receiver. To control this quality, each transmitted hyper-frame HF includes, as already mentioned, a line monitor super-frame MSF that is used by the receiver to measure the quality of the transmission. The receiver informs the transmitter about the results of the measurements and, when the quality is too low, the receiver requests the transmitter to go back to the power-up status, even if only idle data are received at the transmitter input.

Because the power dissipated in the transmitter TU is a function of the number of carriers used and of the kind of symbols transmitted on the telecommunication line, the data traffic detection circuit DDC is further designed to measure the mean traffic of the data received at the input IN. According to the result of this measurement performed for a predetermined time period, the data traffic detection circuit DDC controls, via the terminal CX, the carrier selector CS to allow a reduced set of carriers C1–Cp to be transferred to the coding circuit MMC. The number of carriers selected by CS is a function of the mean traffic detected. By using only the number of carriers that are necessary to transmit the data instead of using all the available carriers, as when effective data are received, the power consumption of the transmitter is reduced.

It is to be noted that the different embodiments and variants of the present transmitter as described above may be used separately or in combination. For instance, it is possible to have a telecommunication transmitter whereof the power consumption is reduced owing to the use of a line driver circuit LDC comprising the parallel connection of a low efficiency line amplifier LL and a high efficiency line amplifier LH operating in a complementary way, but without a carrier selector CS and possibly a data selector DS.

While the principles of the invention have been described above in connection with specific apparatus, it is to be clearly understood that this description is made only by way of example and not as a limitation on the scope of the invention, as defined in the appended claims.

What is claimed is:

1. A telecommunication transmitter (TU) for a multi-carrier transmission system, said transmitter including coding means (MMC) coupled between a transmitter input (IN) and a transmitter output (OUT) and able to modulate a plurality of carriers (C1–Cn) with data received at said transmitter input and to derive therefrom symbols which are transmitted towards said transmitter output, characterized in that said telecommunication transmitter (TU) further includes carrier selection means (CS) adapted to apply said carriers (C1–Cn) to said coding means (MMC), and data traffic detection means (DDC) adapted to detect if idle data are received at said transmitter input (IN) and, if idle data are detected, to control (CX) said carrier selection means to apply a predetermined reduced set (Cp) of said carriers to said coding means.

2. A telecommunication transmitter according to claim 1, characterized in that said predetermined reduced set of carriers comprises only one carrier (Cp) that is applied to said coding means (MMC).

3. A telecommunication transmitter according to claim 2, characterized in that said one carrier (Cp) is a pilot symbol.

4. A telecommunication transmitter according to claim 2, characterized in that, if idle data are detected, said one carrier (Cp) applied to said relatively high efficiency line amplifier (LH) is a sinusoidal wave.

5. A telecommunication transmitter according to claim 1, characterized in that said telecommunication transmitter (TU) further includes data selection means (DS) adapted to apply said data to said coding means (MMC), and in that said data traffic detection means (DDC) is further adapted, if idle data are detected, to control (DX) said data selection means to discard the idle data received at said transmitter input (IN).

6. A telecommunication transmitter according to claim 5, characterized in that said coding means (MMC) is adapted to count the number of symbols transmitted towards said transmitter output (OUT) and to transmit at least one synchronization symbol (SS) after each group of N(68) symbols, said synchronization symbol being derived from a frame of synchronization signals (SYNC) received at said data selection means (DS), and in that said N symbols and said one synchronization symbol form together a super-frame (SF).

7. A telecommunication transmitter according to claim 6, characterized in that said coding means (MMC) is adapted to transmit at least one line monitoring super-frame (MSF) after each group of M (256) super-frames (SF), said line monitoring super-frame including N (68) symbols and at least one synchronization symbol (SS), in that said M super-frames and said line monitoring super-frame form together a hyper-frame (HF), and in that said data traffic detection means (DDC) is adapted to control (CX) said carrier selection means (CS) to apply all the carriers (C1–Cn) of said plurality to said coding means during the transmission of said line monitoring super-frame.

8. A telecommunication transmitter according to claim 4, characterized in that said data traffic detection means (DDC) is adapted to control (DX) said data selection means (DS) to discard idle data received at said transmitter input (IN) after idle data has been detected for a predetermined period of time.

9. A telecommunication transmitter according to claim 1, characterized in that said transmitter operates according to a predetermined mapping and modulating protocol defined by a digital subscriber line (DSL) standard such as the Asymmetrical Digital Subscriber Line (ADSL) standard, and in that said symbols derived from said data are Discrete Multi-Tone (DMT) symbols.

10. A telecommunication transmitter according to claim 1, characterized in that said data received at said transmitter input (IN) are Asynchronous Transfer Mode (ATM) cells.

11. A telecommunication transmitter according to claim 1, characterized in that said telecommunication transmitter (TU) further includes line driver means (LDC) coupled between said coding means (MMC) and said transmitter output (OUT) and adapted to amplify the symbols generated by said coding means prior to transmitting them to said transmitter output, said line driver means (LDC) comprising the parallel connection of a relatively low efficiency line amplifier (LL) and a relatively high efficiency line amplifier (LH), in that said amplifiers operate in a complementary way so that only one of said amplifiers is operational at a predetermined time moment, and in that said data traffic detection means (DDC) is further adapted to control the operation of said relatively high efficiency line amplifier (LH) if idle data are detected.

12. A telecommunication transmitter according to claim 11, characterized in that, if idle data are detected, said one carrier (Cp) applied to said relatively high efficiency line amplifier (LH) is a sinusoidal wave.

13. A telecommunication transmitter according to claim 1, characterized in that said telecommunication transmitter (TU) further includes line driver means (LDC) coupled between said coding means (MMC) and said transmitter output (OUT) and adapted to amplify the symbols generated by said coding means prior to transmitting them to said transmitter output, in that said data traffic detection means (DDC) is further adapted, if idle data are detected, to control the quiescent current of said line driver means (LDC) in order to reduce the power consumption thereof.

14. A telecommunication transmitter according to claim 1, characterized in that said data traffic detection means (DDC) is further adapted to compute the mean traffic of effective data received at said transmitter input (IN) over a predetermined period of time, and, accordingly, to control (CX) said carrier selection means (CS) to apply a predetermined reduced set of said carriers (C1–Cn) to said coding means (MMC) as a function of the computed mean traffic.

* * * * *

UNITED STATES PATENT AND TRADEMARK OFFICE
CERTIFICATE OF CORRECTION

PATENT NO. : 6,246,725 B1
DATED : June 12, 2001
INVENTOR(S) : Etienne Vanzieleghem, Frank C. Defoort, Peter P. Reusens It is certified that error appears in the above-identified patent and that said Letters Patent is hereby corrected as shown below:

Column 9, claim 8,
Line 29, "claim 4" should be -- claim 5 --.

Signed and Sealed this

Fifteenth Day of January, 2002

Attest:

JAMES E. ROGAN
Director of the United States Patent and Trademark Office

Attesting Officer